(12) United States Patent
Park

(10) Patent No.: US 10,106,147 B2
(45) Date of Patent: Oct. 23, 2018

(54) METHOD AND DEVICE FOR CONTROLLING TORQUE INTERVENTION OF HYBRID VEHICLE

(71) Applicant: Hyundai Motor Company, Seoul (KR)

(72) Inventor: Joonyoung Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 94 days.

(21) Appl. No.: 15/244,574

(22) Filed: Aug. 23, 2016

(65) Prior Publication Data

US 2017/0144651 A1 May 25, 2017

(30) Foreign Application Priority Data

Nov. 19, 2015 (KR) .................. 10-2015-0162672
Jul. 12, 2016 (KR) .................. 10-2016-0088159

(51) Int. Cl.
*B60W 20/00* (2016.01)
*B60W 20/15* (2016.01)
(Continued)

(52) U.S. Cl.
CPC ............ *B60W 20/15* (2016.01); *B60W 10/06* (2013.01); *B60W 10/08* (2013.01); *B60W 10/11* (2013.01);
(Continued)

(58) Field of Classification Search
CPC ...... B60W 20/15; B60W 10/06; B60W 10/08; B60W 30/19; B60W 2510/06; B60W 2510/0661; B60W 2710/06; B60W 2710/0666; Y10S 903/905
(Continued)

(56) References Cited

U.S. PATENT DOCUMENTS 6,196,344 B1 * 3/2001 Tamor .................. B60K 6/48
180/65.25
8,862,350 B2 * 10/2014 Heap .................. B60W 10/06
180/336
(Continued)

FOREIGN PATENT DOCUMENTS

JP 2015-142494 A 8/2015
KR 10-0829311 B1 5/2008
(Continued)

*Primary Examiner* — Shardul D Patel
(74) *Attorney, Agent, or Firm* — Mintz Levin Cohn Ferris Glovsky and Popeo, P.C.; Peter F. Corless

(57) ABSTRACT

A method for controlling torque intervention of a hybrid vehicle includes: during a torque phase time interval, reducing torque of an engine which is connected to a motor and generates a power transferred to a transmission by reducing an amount of air supplied to the engine in a state in which control for generating optimal combustion efficiency of the engine is maintained; increasing torque of the motor as much as the reduced torque of the engine during the torque phase time interval; and during an inertia phase time interval, reducing the increased torque of the motor by subtracting the reduced torque of the engine from an amount of torque intervention request for the transmission. The control for generating optimal combustion efficiency is obtained by controlling an ignition angle of the engine according to the amount of air supplied to the engine to maximize efficiency of the engine.

9 Claims, 10 Drawing Sheets

(51) Int. Cl.
*B60W 10/06* (2006.01)
*B60W 10/08* (2006.01)
*B60W 30/19* (2012.01)
*B60W 10/11* (2012.01)

(52) U.S. Cl.
CPC ......... *B60W 30/19* (2013.01); *B60W 2510/06* (2013.01); *B60W 2510/0661* (2013.01); *B60W 2710/06* (2013.01); *B60W 2710/0666* (2013.01); *B60W 2710/0672* (2013.01); *B60W 2710/083* (2013.01); *B60W 2710/085* (2013.01); *B60W 2710/1022* (2013.01); *Y02T 10/6286* (2013.01); *Y10S 903/905* (2013.01)

(58) Field of Classification Search
USPC ............ 701/22, 101, 54; 477/107, 343, 113; 180/336, 65.265; 903/902; 123/406.23, 123/436, 339.14
See application file for complete search history.

(56) References Cited

U.S. PATENT DOCUMENTS

| | | | |
|---|---|---|---|
| 2004/0132580 A1* | 7/2004 | Metzger | B60W 10/02 477/101 |
| 2006/0156710 A1* | 7/2006 | Pott | B60K 6/48 60/285 |
| 2008/0148828 A1* | 6/2008 | Milos | F02B 37/16 73/114.33 |
| 2012/0029777 A1* | 2/2012 | Tao | F16H 61/0213 701/60 |
| 2013/0325233 A1* | 12/2013 | Whitney | B60W 20/108 701/22 |
| 2014/0005911 A1* | 1/2014 | Menold | F02D 45/00 701/101 |
| 2014/0148309 A1* | 5/2014 | Yamazaki | B60W 10/06 477/109 |
| 2015/0012159 A1* | 1/2015 | Honda | B60K 6/445 701/22 |
| 2016/0082821 A1* | 3/2016 | Mueller | B60K 6/365 180/65.21 |
| 2016/0107634 A1* | 4/2016 | Kim | B60W 10/06 701/22 |
| 2016/0318500 A1* | 11/2016 | Ohn | B60W 20/10 |

FOREIGN PATENT DOCUMENTS

| | | |
|---|---|---|
| KR | 10-2011-0044566 A | 4/2011 |
| WO | 2009/081729 A1 | 7/2009 |

* cited by examiner

METHOD AND DEVICE FOR CONTROLLING TORQUE INTERVENTION OF HYBRID VEHICLE

CROSS-REFERENCE TO RELATED APPLICATIONS

This application claims under 35 U.S.C. § 119(a) the benefit of Korean Patent Application No. 10-2015-0162672 filed in the Korean Intellectual Property Office on Nov. 19, 2015 and Korean Patent Application No. 10-2016-0088159 filed in the Korean Intellectual Property Office on Jul. 12, 2016, the entire contents of which are incorporated herein by reference.

BACKGROUND (a) Technical Field

The present invention relates to a hybrid vehicle (or a hybrid electric vehicle), and more particularly, to a method and a device for controlling torque intervention of the hybrid vehicle.

(b) Description of the Related Art

An environmentally-friendly vehicle includes a fuel cell vehicle, an electric vehicle, a plug-in electric vehicle, and a hybrid vehicle, and typically includes a motor to generate driving force.

A hybrid vehicle, which is an example of the environmentally-friendly vehicle, uses an internal combustion engine and power of a battery together. In other words, the hybrid vehicle efficiently combines and uses power of the internal combustion engine and power of a motor.

The hybrid vehicle can include an engine, a motor, an engine clutch to adjust power between the engine and the motor, a transmission, a differential gear apparatus, a battery, a starter-generator that starts the engine or generates electricity by output of the engine, and wheels.

Further, the hybrid vehicle can includes a hybrid control unit (HCU) for controlling an entire operation of the hybrid vehicle, an engine control unit (ECU) for controlling an operation of the engine, a motor control unit (MCU) for controlling an operation of the motor, a transmission control unit (TCU) for controlling an operation of the transmission, and a battery control unit (BCU) for controlling and managing the battery.

The battery control unit can be called a battery management system (BMS). The starter-generator can be called an integrated starter and generator (ISG) or a hybrid starter and generator (HSG).

The hybrid vehicle can be driven in a driving mode, such as an electric vehicle (EV) mode, which is an electric vehicle mode using only power of the motor, a hybrid vehicle (HEV) mode, which uses rotational force of the engine as main power and uses rotational force of the motor as auxiliary power, and a regenerative braking (RB) mode for collecting braking and inertial energy during driving by braking or inertia of the vehicle through electricity generation of the motor to charge the battery.

The TCU can request a torque intervention (or a torque reduction) to the transmission in order to prevent gear shifting shock at gear shifting and protect the transmission. In particular, in order to reduce the shock that occurs when a clutch in the transmission is connected or disconnected during gear shifting, torque intervention control that momentarily reduces a torque inputted to the transmission is performed.

The above information disclosed in this Background section is only for enhancement of understanding of the background of the invention and therefore it may contain information that does not form the prior art that is already known in this country to a person of ordinary skill in the art.

SUMMARY

The present invention provides a method and a device for controlling torque intervention of a hybrid vehicle which are capable of increasing efficiency of an engine to improve fuel efficiency of the hybrid vehicle by adjusting torque of the engine and torque of a motor (or a driving motor) in a torque intervention control process for controlling a transmission input torque.

According to an exemplary embodiment of the present invention, a method for controlling torque intervention of the hybrid vehicle includes: during a torque phase time interval included in a shifting time interval, reducing, by a controller, torque of an engine which is connected to a motor through an engine clutch and generates a power transmitted to a transmission by reducing an amount of air supplied to the engine in a state in which control for generating optimal combustion efficiency of the engine is maintained; increasing, by the controller, torque of the motor as much as the reduced torque of the engine during the torque phase time interval; and during an inertia phase time interval included in the shifting time interval, reducing, by the controller, the increased torque of the motor as a value obtained by subtracting the reduced torque of the engine from an amount of torque intervention request for the transmission. The control for generating optimal combustion efficiency may be obtained by controlling an ignition angle of the engine according to the amount of air supplied to the engine to maximize efficiency of the engine.

The method for controlling torque intervention of the hybrid vehicle may further include: after the inertia phase time interval, increasing, by the controller, torque of the engine as much as the reduced torque of the engine by increasing the amount of air supplied to the engine in the state in which the control for generating optimal combustion efficiency is maintained; and after the inertia phase time interval, increasing, by the controller, torque of the motor as much as a value obtained by subtracting the increased torque of the engine from a torque inputted to the transmission.

The transmission may include a dual clutch transmission.

According to another exemplary embodiment of the present invention, a method for controlling torque intervention of the hybrid vehicle includes: predicting, by the controller, a shifting time of a transmission and an amount of torque intervention request for the transmission in an inertia phase time interval included in a shifting time interval by a shift pattern map based on a current speed of the vehicle; after the predicted shifting time, reducing, by the controller, torque of an engine which is connected to a motor through an engine clutch and generates a power transmitted to the transmission by reducing an amount of air supplied to the engine in a state in which control for generating optimal combustion efficiency of the engine is maintained; increasing, by the controller, torque of the motor as much as the reduced torque of the engine; and during the inertia phase time interval, reducing, by the controller, the increased torque of the motor as a value obtained by subtracting the reduced torque of the engine from the amount of torque intervention request for the transmission. The control for generating optimal combustion efficiency may be obtained by controlling an ignition angle of the engine according to the amount of air supplied to the engine to maximize efficiency of the engine.

The method for controlling torque intervention of the hybrid vehicle may further include: after the inertia phase time interval, increasing, by the controller, torque of the engine as much as the reduced torque of the engine by increasing the amount of air supplied to the engine in the state in which the control for generating optimal combustion efficiency is maintained; and after the inertia phase time interval, increasing, by the controller, torque of the motor as much as a value obtained by subtracting the increased torque of the engine from a torque inputted to the transmission.

The transmission may include a dual clutch transmission.

According to an exemplary embodiment of the present invention, a device for controlling torque intervention of the hybrid vehicle includes: an engine which is connected to a motor through an engine clutch and generates a power transmitted to a transmission; and a controller which predicts a shifting time of a transmission and an amount of torque intervention request for the transmission in an inertia phase time interval included in a shifting time interval by a shift pattern map based on a current speed of the vehicle. After the predicted shifting time, the controller may reduce torque of the engine by reducing an amount of air supplied to the engine in a state in which control for generating optimal combustion efficiency of the engine is maintained, the controller may increase torque of the motor as much as the reduced torque of the engine, during the inertia phase time interval, the controller may reduce the increased torque of the motor as a value obtained by subtracting the reduced torque of the engine from the amount of torque intervention request for the transmission, and the control for generating optimal combustion efficiency may be obtained by controlling an ignition angle of the engine according to the amount of air supplied to the engine to maximize efficiency of the engine.

After the inertia phase time interval, the controller may increase torque of the engine as much as the reduced torque of the engine by increasing the amount of air supplied to the engine in the state in which the control for generating optimal combustion efficiency is maintained and may increase torque of the motor as much as a value obtained by subtracting the increased torque of the engine from a torque inputted to the transmission.

The transmission may include a dual clutch transmission.

The method and the device for controlling torque intervention of the hybrid vehicle according to the exemplary embodiment of the present invention may avoid (or prevent) a torque intervention control (or a torque reduction control) using the engine in a gear-shifting process.

Further, according to the present invention, it is possible to improve fuel efficiency of the hybrid vehicle by increasing a time interval that maintains the control for generating optimal combustion efficiency which is eco (economy or efficiency) ignition angle control for the engine.

BRIEF DESCRIPTION OF THE DRAWINGS

A brief description of the drawings will be provided to more sufficiently understand the drawings which are used in the detailed description of the present invention.

DETAILED DESCRIPTION OF THE EMBODIMENTS

Figure 1:
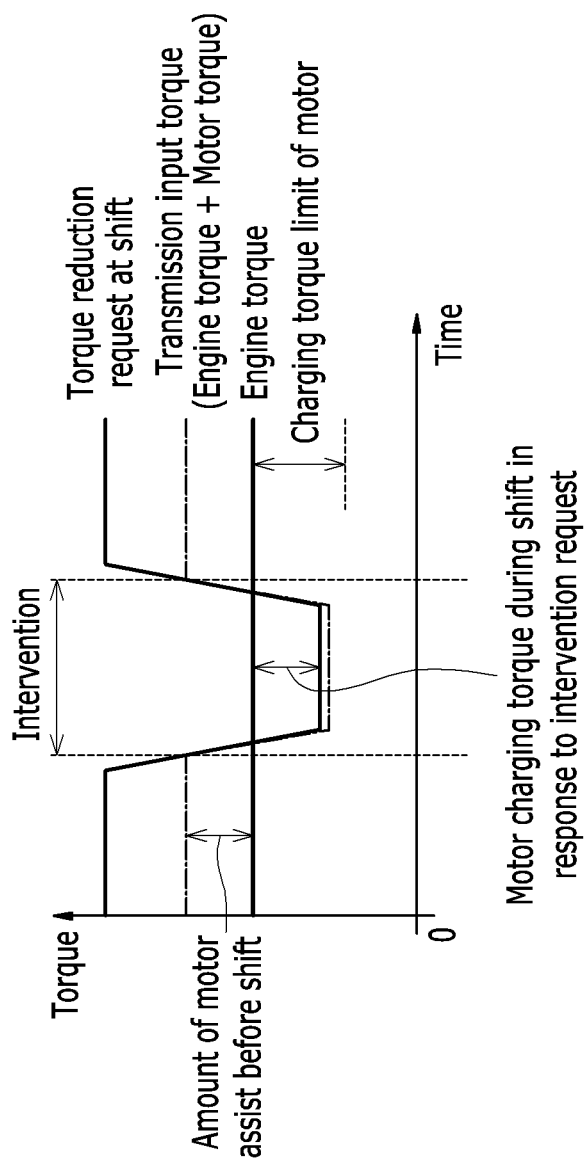
FIG. 1 is a view representing an example of torque intervention control for a transmission input torque.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In torque intervention control of a hybrid vehicle, torque reduction in an input side of a transmission is needed in a shifting process of a multiple speed transmission such as an automatic transmission (AT) or a dual clutch transmission (DCT).

A transmission electric mounted device (TMED) hybrid vehicle that is a TMED system has an engine and a motor disposed in the input side of the transmission, and thus torques of two power sources including the engine and the motor can be reduced.

FIG. 1 is a view representing an example of torque intervention control for a transmission input torque.

Referring to FIG. 1, in the hybrid vehicle including the automatic transmission, an amount of torque intervention request is relatively small, and thus torque intervention control may be performed only by controlling torque of the motor.

Figure 2:
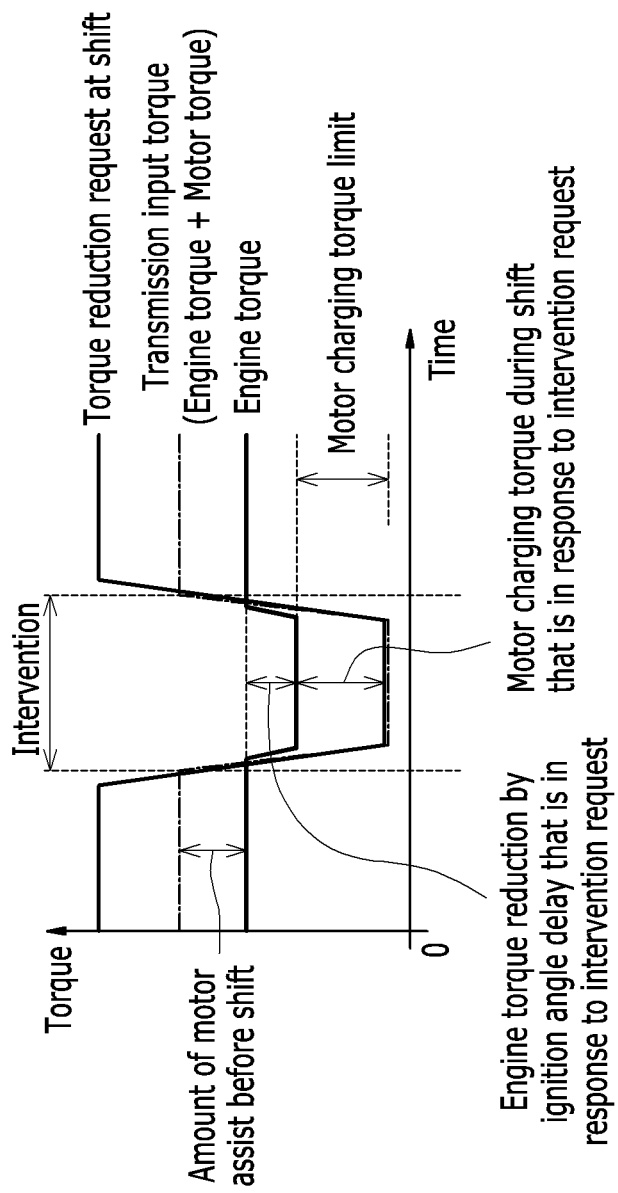
FIG. 2 is a view representing another example of torque intervention control for a transmission input torque.

FIG. 2 is a view representing another example of torque intervention control for a transmission input torque.

Referring to FIG. 2, in the hybrid vehicle including the dual clutch transmission (DCT), an amount of torque intervention request is relatively large, and thus torque intervention control may be performed by controlling torque of the engine and torque of the motor.

An amount of torque intervention request for the hybrid vehicle including the DCT can be greater than an amount of torque intervention request for the hybrid vehicle including the AT.

The torque intervention request can be responded to by the motor torque reduction or by using reverse torque of the motor torque. However, when torque of the motor is used up to a charging limit torque, the engine torque reduction can be required as shown in FIG. 2. In order to reduce torque of the engine, a dynamic ignition angle control for the engine can be used. The dynamic ignition angle control is an ignition timing control for the engine, but does not correspond to eco (economy or efficiency) ignition angle control for the engine that is control for generating optimal combustion efficiency of the engine. In the dynamic ignition angle control, the engine torque reduction for torque intervention in a state that maintains amounts of air and fuel supplied to the engine is obtained or realized as ignition angle retard (or ignition angle delay) for the engine, thereby causing fuel waste.

The eco ignition angle control can optimally control (e.g., control an advance angle of) an ignition timing of the engine to improve efficiency of the engine based on amounts of air and fuel that are currently supplied to the engine (or the engine cylinder). In particular, the eco ignition angle control may mean ignition angle control for the engine that maximizes efficiency of the engine. Controlling the advance angle of ignition timing may mean increasing output of the engine by advancing ignition timing before a top dead center (TDC) of the engine that is a reference point. Controlling a retard angle of ignition timing may mean reducing output of the engine by retarding ignition timing after the TDC. However, the eco ignition angle control cannot precisely control amounts of air and fuel that will be supplied as amounts required to implement a target torque of the engine because of fluid behavior characteristics. As a result, when the eco ignition angle control is performed, efficiency of the engine can be improved, but a follow-up error regarding a demand torque can occur.

The dynamic ignition angle control can sacrifice efficiency of the engine in order to follow the demand torque. In order to implement the demand torque, the dynamic ignition angle control can consider a slow behavior of fluids to provide amounts of air and fuel that are more than the required amounts to the engine. The dynamic ignition angle control may delay the ignition angle in order to implement the torque by using the amounts of air and fuel that are more than the required amounts. Therefore, when the engine torque reduction is required in torque intervention, the dynamic ignition angle control can be performed in order to correctly follow the torque.

Figure 3:
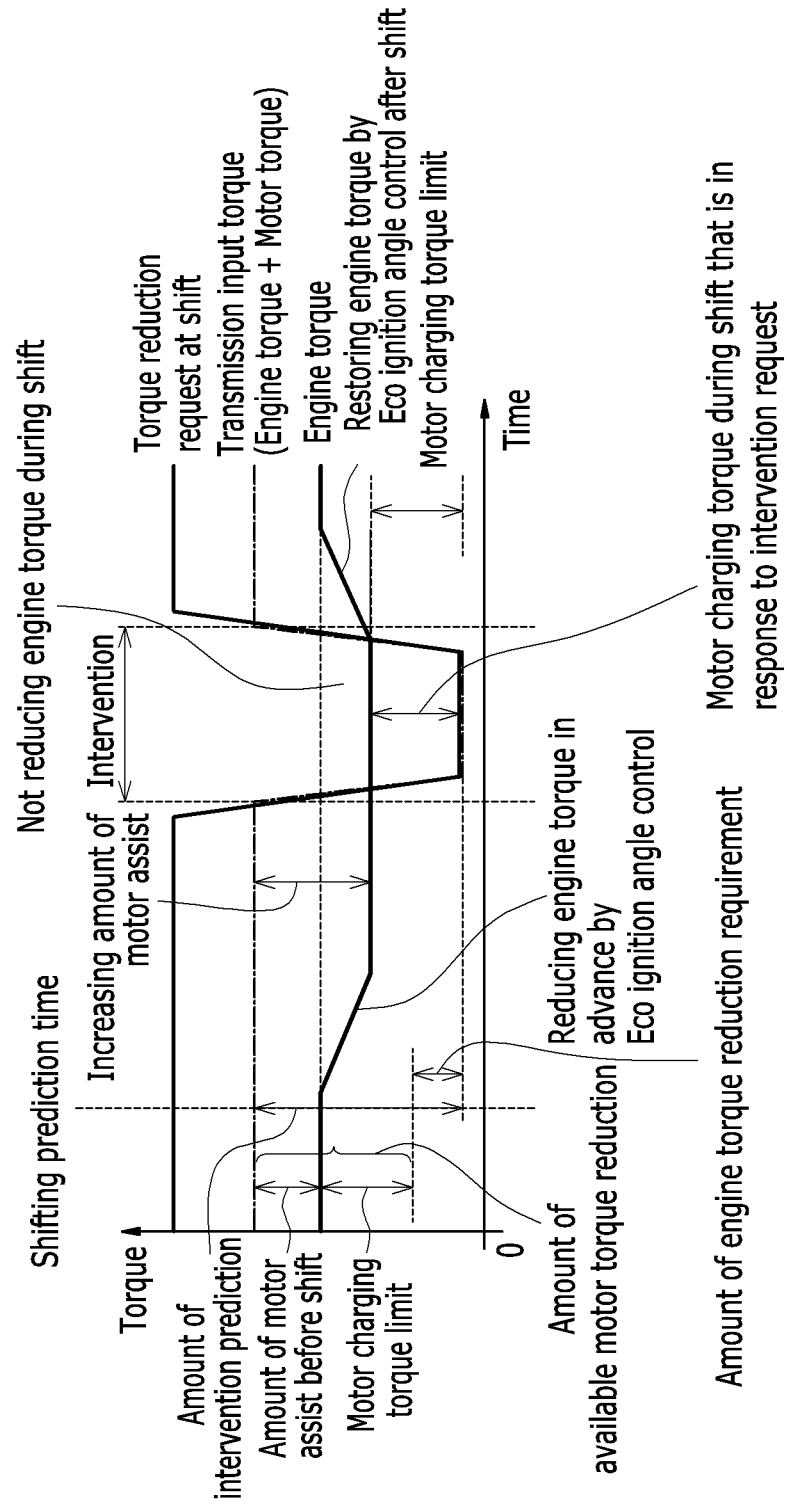
FIG. 3 is a view for explaining a method for controlling torque intervention of a hybrid vehicle according to an exemplary embodiment of the present invention.
Figure 7:
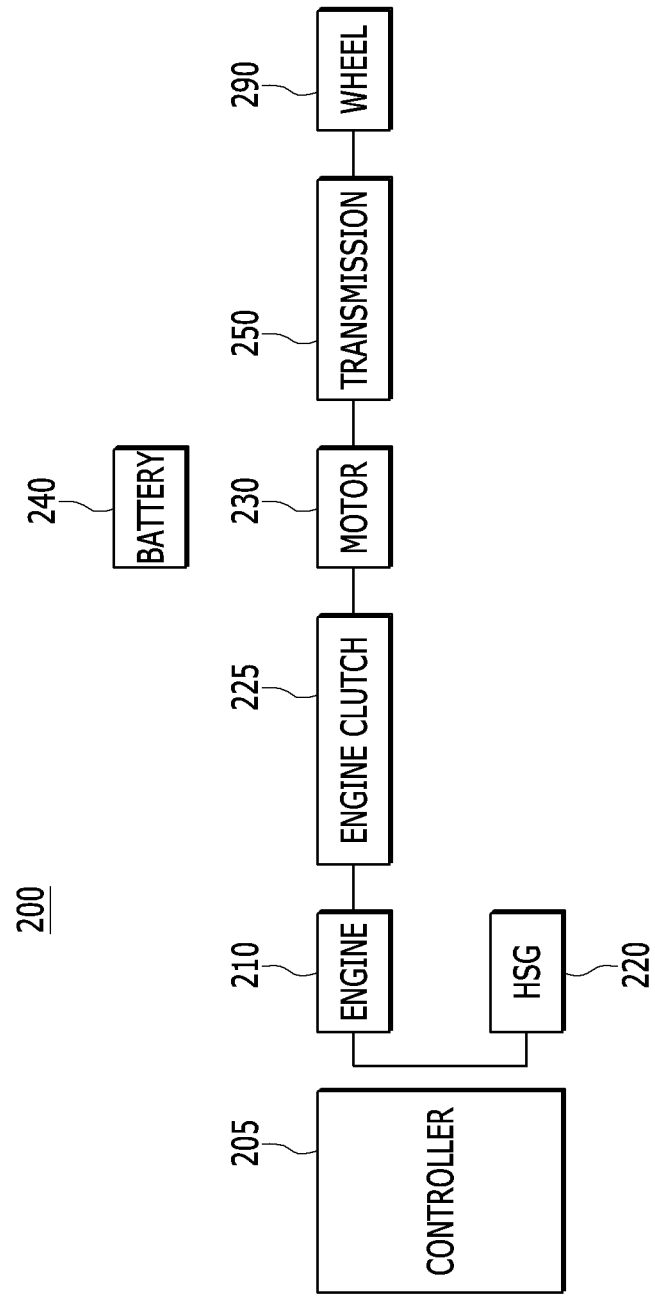
FIG. 7 is a block diagram explaining the hybrid vehicle including the device for controlling torque intervention of the hybrid vehicle according to an exemplary embodiment of the present invention.

FIG. 3 is a view for explaining a method for controlling torque intervention of a hybrid vehicle according to an exemplary embodiment of the present invention. FIG. 7 is a block diagram explaining the hybrid vehicle including the device for controlling torque intervention of the hybrid vehicle according to an exemplary embodiment of the present invention. The device for controlling torque intervention of the hybrid vehicle may be applied to a hybrid vehicle 200 shown in FIG. 7.

Referring to FIG. 3 and FIG. 7, the hybrid vehicle 200 includes a controller 205, an engine 210, a hybrid starter-generator (HSG) 220, an engine clutch 225, a motor (or a driving motor) 230 which may be an electric motor, a battery 240, a transmission 250, and wheels (or driving wheels) 290.

A device for controlling torque intervention of the hybrid vehicle may include the engine 210 and the controller 205. As shown in FIG. 3, before shifting (or before torque intervention), the device for controlling torque intervention of the hybrid vehicle may adjust a power distribution ratio between the engine 210 and the motor 230 to avoid torque intervention (or torque reduction) of the engine 210, and may predict the shifting (or gear shifting) of the transmission 250 to reduce torque of the engine 210 at the time which the shifting is predicted at.

The engine 210 may be connected to the motor 230 through the engine clutch 225 and may generate a power transferred to the transmission 250.

The controller 205 may predict (or extract) a shifting time of the transmission 250 and an amount of torque intervention request for the transmission 250 in an inertia phase time interval (or a torque intervention control time interval) included in a shifting time interval by a shift pattern map (or a shift pattern map table) based on a current speed of the vehicle 200. The amount of torque intervention request for the transmission 250 may be a value of torque intervention request for input torque of the transmission 250. In particular, the controller 205 may use the current speed of the vehicle (or a current wheel speed), a current demand torque, a current gear stage (or a current gear), gradient of the road, etc. to predict the shifting time by the predetermined shift pattern map and estimate an amount of torque intervention that is required before shifting.

Shift pattern map data according to the speed of the vehicle or the like may be stored in the shift pattern map. The shift pattern map data may be determined in advance by experimental results. The shift pattern map may be stored in a storage unit in the controller 205 or a storage unit outside the controller 205.

After the predicted shifting time (or the shifting prediction time), the controller 205 may reduce torque (or output torque) of the engine 210 by reducing an amount of air supplied to the engine in a state in which control for generating optimal combustion efficiency of the engine is maintained. The control for generating optimal combustion efficiency, which is eco (economy or efficiency) ignition angle control, may be obtained by controlling an ignition angle of the engine according to the amount of air (or an amount of fuel) supplied to the engine in order to maximize efficiency (or combustion efficiency) of the engine. The control for generating optimal combustion efficiency may optimally control (e.g., control an advance angle of) ignition timing of the engine to improve efficiency of the engine based on amounts of air and fuel that are currently supplied to the engine (or the engine cylinder).

The controller 205 may increase torque of the motor 230 as much as the reduced torque of the engine. Torque of the motor 230 in FIG. 3 is illustrated based on torque of the engine 210. During the inertia phase time interval, the controller 205 may reduce the increased torque of the motor as a value obtained by subtracting the reduced torque of the engine from the amount of torque intervention request for the transmission 250. The amount of torque intervention request may be a value that is determined by a test in order to naturally perform shifting operation of the transmission 250. A charging torque limit value of the motor that may respond to the torque intervention request may mean a maximum torque value of the motor (or a maximum reverse torque of the motor) that may generate a maximum charging value of the battery 240.

After the inertia phase time interval, the controller 205 may increase torque of the engine 210 as much as the reduced torque of the engine by increasing the amount of air supplied to the engine in the state in which the control for generating optimal combustion efficiency is maintained and may increase torque of the motor 230 as much as a value obtained by subtracting the increased torque of the engine from a torque required for input of the transmission 250 (or the transmission input torque).

As described above, when a predicted amount of torque intervention is greater than an amount of available torque intervention of the motor 230, the controller 205 may reduce torque of the engine 210 in advance and may increase torque of the motor 230. The controller 205 may perform torque intervention control in advance before shifting, and thus the engine torque reduction may be performed by reducing the amount of air supplied to the engine in the state in which the control for generating optimal combustion efficiency is maintained.

The amount of available torque intervention of the motor 230 may be a sum of a current torque of the motor that may be increased before shifting and the charging torque limit value of the motor, and thus the amount of available torque intervention may be also increased when torque of the motor is increased.

The motor 230 may perform charging control when cruise travel (or cruise control) of a hybrid electric vehicle (HEV) mode is performed, thereby easily increasing the amount of available torque intervention of the motor.

The controller 205 may use the increased amount of available torque intervention to respond to the torque intervention request for the transmission. A transmission control unit (TCU) may request torque intervention to the controller 205. The controller 205 may control the engine 210 to maintain a current torque in the state in which the control for generating optimal combustion efficiency is maintained.

After shifting in the transmission 250 is completed, the controller 205 may control torque of the engine 210 and torque of the motor 230 to return to an original torque distribution ratio between the engine and the motor. Restoration of the engine torque may be performed in the state in which the control for generating optimal combustion efficiency is maintained.

According to the present invention, it is possible to respond to (or perform) torque intervention that is required in the HEV mode of the hybrid vehicle including a dual clutch transmission (DCT) only by using the motor to control a transient torque. Thus, because the dynamic ignition angle control for the engine is not used, fuel efficiency of the hybrid vehicle may be improved. The dynamic ignition angle control may sacrifice efficiency of the engine in order to follow a demand torque.

The hybrid vehicle 200, which is a hybrid electric vehicle, may use the engine 210 and the motor 230 as power sources, and includes the engine clutch 225 existing between the engine 210 and the motor 230 so that the hybrid vehicle 200 may be operated in an electric vehicle (EV) mode in which the hybrid vehicle 200 travels by the motor 230 in a state where the engine clutch 225 is opened, and in the HEV mode in which the hybrid vehicle 200 is capable of travelling by both the motor 230 and the engine 210 in a state where the engine clutch 225 is closed.

The hybrid vehicle 200 may include a power train of a transmission mounted electric device (TMED) type in which the motor 230 is connected to the transmission 250. The hybrid vehicle 200 may provide a driving mode, such as the EV mode, which is the electric vehicle mode using only power of the motor, and the HEV mode, which uses rotational force of the engine as main power and uses rotational force of the motor as auxiliary power depending on whether the engine clutch 225 that is disposed between the engine 210 and the motor 230 is engaged (or connected). In particular, in the hybrid vehicle 200 including a structure in which the motor 230 may be directly connected to the transmission 250, revolutions per minute (RPM) of the engine may be increased by drive of the HSG 220, power delivery and power cutoff between the engine and the motor may be performed via engagement and release of the clutch 225, a driving force may be transmitted (or transferred) to the wheels 290 through a power transmission system which may include the transmission 250, and torque of the engine may be transmitted to the motor via engagement of the clutch 225 when transmission of the engine torque is requested.

The controller 205 may include a hybrid control unit (HCU), a motor control unit (MCU), an engine control unit (ECU), and the TCU.

The HCU may control starting of the engine by controlling the HSG 220 when the engine 210 stops. The HCU may be the highest controller, and may synthetically control controllers (for example, the MCU) connected to a network such as a controller area network (CAN) which is a vehicle network, and may control overall operation of the hybrid vehicle 200.

The MCU may control the HSG 220 and the motor 230. The MCU may control an output torque of the driving motor 230 through the network depending on the control signal output from the HCU, and thus may control the motor to operate at maximum efficiency. The MCU may include an inverter configured as a plurality of power switching elements. A power switching element included in the inverter may include an insulated gate bipolar transistor (IGBT), a field effect transistor (FET), a metal oxide semiconductor FET (MOSFET), a transistor, or a relay. The inverter converts a direct current (DC) voltage that is supplied from the battery 240 into a three-phase alternating current (AC) voltage to drive the driving motor 230. The MCU may be disposed between the battery 240 and the motor 230.

The ECU may control a torque of the engine 210. The ECU may control an operating point (or a driving point) of the engine 210 through the network depending on a control signal output from the HCU, and may control the engine to output an optimal torque. The TCU may control an operation of the transmission 250.

For example, the controller 205 may be one or more microprocessors operated by a program or hardware including the microprocessor. The program may include a series of commands for executing a method of controlling torque intervention of the hybrid vehicle according to an exemplary embodiment of the present invention, which will be described below.

The engine 210 may include a diesel engine, a gasoline engine, a liquefied natural gas (LNG) engine, or a liquefied petroleum gas (LPG) engine, and may output a torque at the operating point depending on a control signal output from the ECU. The torque may be combined with driving force of the driving motor 230 in the HEV mode.

The HSG 220 may operate as a motor depending on a control signal output from the MCU to start the engine 210, and may operate as a generator in a state in which start of the engine 210 is maintained to provide generated electric power to the battery 240 via the inverter. The HSG 220 may be connected to the engine 210 through a belt.

The engine clutch 225 may be disposed (or mounted) between the engine 210 and the driving motor 230, and may be operated to switch power delivery between the engine 210 and the motor 230. The engine clutch 225 may connect or intercept power between the engine and the motor depending on switching of the HEV mode and the EV mode. Operation of the engine clutch 225 may be controlled by the controller 205.

The motor 230 may be operated by a three-phase AC voltage that is output from the MCU to generate a torque. The motor 230 may be operated as a generator during coasting drive or regenerative braking to supply a voltage (or regenerative energy) to the battery 240.

The battery 240 may include a plurality of unit cells. A high voltage for providing a driving voltage (for example, 350-450 V DC) to the motor 230 that provides driving power to the wheels 290 may be stored in the battery 240.

The transmission 250 may include a multiple speed transmission such as the DCT, and may shift to a desired gear by using hydraulic pressure depending on control of the TCU to operate engagement elements and disengagement elements. The transmission 250 may transmit driving force of the engine 210 and/or the motor 230 to the wheels 290, and may intercept power delivery between the motor 230 (or the engine 210) and the wheels 290.

Figure 4:
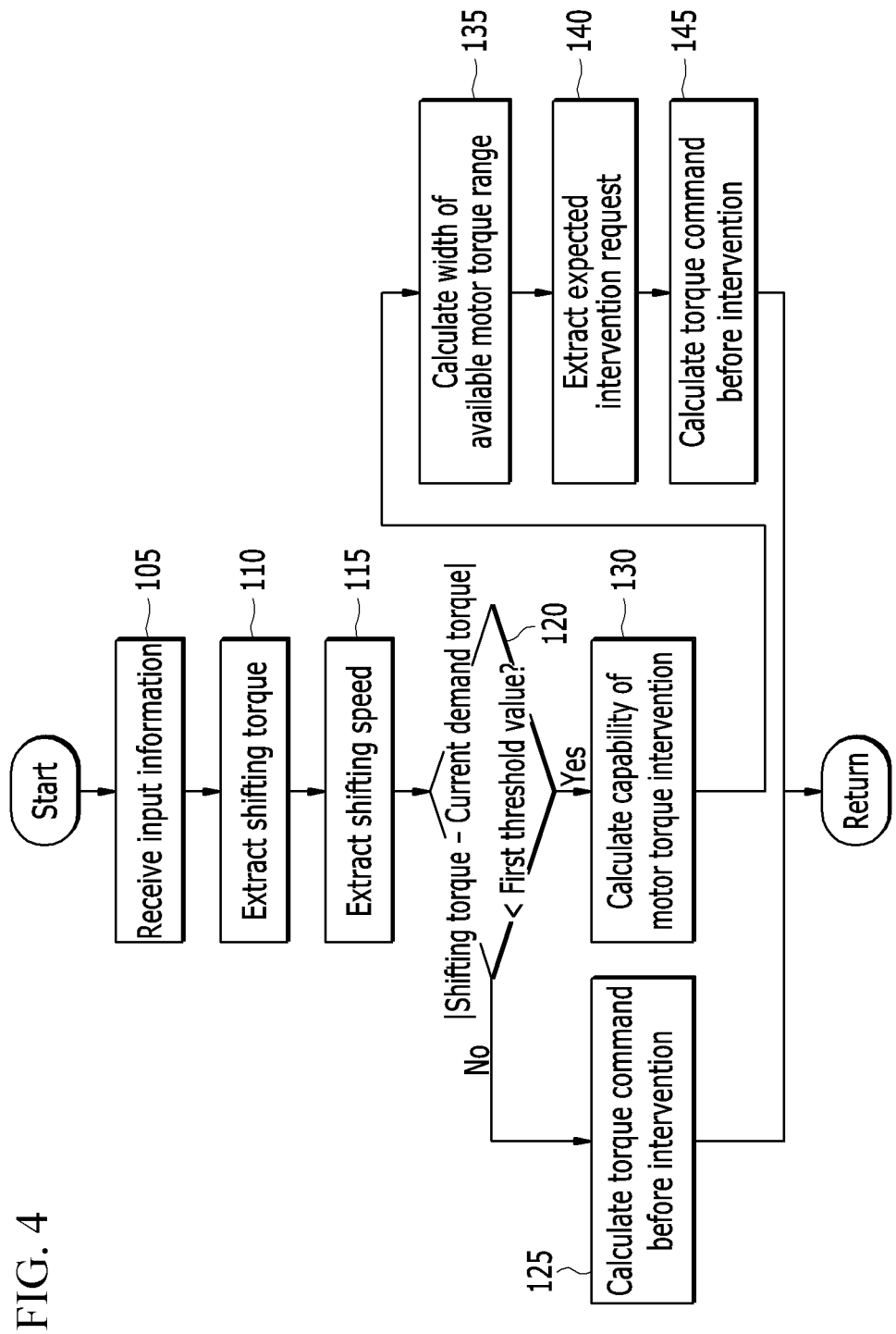
FIG. 4 is a flowchart describing an embodiment of the method for controlling torque intervention of the hybrid vehicle shown in FIG. 3.

FIG. 4 is a flowchart describing an embodiment of the method for controlling torque intervention of the hybrid vehicle shown in FIG. 3.

Referring to FIG. 4 and FIG. 7, in an input information receiving step 105, the controller 205 may receive input information for torque intervention control for controlling input torque of the transmission 250. The input information may include the current demand torque that is a sum of target motor torque and target engine torque, the current wheel speed (or the current speed of the vehicle), the current gear stage of the transmission 250, the target motor torque that is the motor torque before intervention, the target engine torque that is the engine torque before intervention, the charging torque limit value of the motor, and a discharging torque limit value of the motor. The discharging torque limit value of the motor may mean a maximum torque value of the motor that may generate a maximum discharging value of the battery 240.

The controller 205 may calculate the current demand torque (or a driver's current demand torque) in response to an accelerator pedal signal output from an acceleration pedal position sensor (APS) (not shown) that is included in the hybrid vehicle 200. The APS may detect (or sense) an operation of an accelerator pedal by the driver, and may provide a signal corresponding to an operating force that is applied to an accelerator pedal to the HCU. The APS may detect an amount of depression of the accelerator pedal which the driver steps on while driving. The current wheel speed and the like may be detected by a sensor included in the hybrid vehicle 200.

According to a shift torque extracting step 110, from the shift pattern map, the controller 205 may detect (or predict) a shifting torque (or the transient torque) of the transmission 250 that is a demand torque when gear shifting occurs under the assumption that the current wheel speed is maintained. In particular, the controller 205 may use the current wheel speed and the current gear stage to extract (or determine) the shifting torque from the shift pattern map.

According to a shift speed extracting step 115, from the shift pattern map, the controller 205 may detect (or predict) a shifting speed of the transmission 250 that is a wheel speed at which gear shifting occurs under the assumption that the current demand torque is maintained. In particular, the controller 205 may extract (or determine) the shifting speed from the shift pattern map based on the current demand torque and the current gear stage.

According to a gear shifting predicting step 120, the controller 205 may determine (or check) whether or not gear shift is predicted. In particular, the controller 205 may check whether the current demand torque that is a torque at a current operating point approaches the shifting torque that is a torque at a gear shifting point. In other words, in order to determine whether a gear shift is generated, the controller 205 may determine whether an absolute value of a value obtained by subtracting the current demand torque from the shifting torque is smaller than a first threshold value. In another exemplary embodiment of the present invention, in order to determine whether a gear shift is generated, the controller 205 may determine whether an absolute value of a value obtained by subtracting the current wheel speed from the shifting speed is smaller than a second threshold value.

When it is determined that the absolute value of the value obtained by subtracting the current demand torque from the shifting torque is not less than the first threshold value, a process that is the method for controlling torque intervention of the hybrid vehicle proceeds to a first torque command calculating step 125. When it is determined that the absolute value of the value obtained by subtracting the current demand torque from the shifting torque is less than the first threshold value, the process proceeds to a motor torque intervention capability calculating step 130.

According to the first torque command calculating step 125, before the torque intervention control, the controller 205 may calculate (or generate) a torque command as follows. A motor torque command may be the target motor torque. An engine torque command may be the target engine torque. After the first torque command calculating step 125, the controller 205 may apply the motor torque command that controls the motor torque to become the target motor torque to the MCU (or the inverter connected to the motor), and may apply the engine torque command that controls the engine torque to become the target engine torque to the ECU (or the engine).

According to the motor torque intervention capability calculating step 130, the controller 205 may calculate an intervention capability of the motor torque. The capability may be a value obtained by subtracting the charging torque limit value of the motor from the target motor torque.

According to a width calculating step 135, the controller 205 may calculate a width of an available torque range of the motor. The width may be a value obtained by subtracting the charging torque limit value of the motor from the discharging torque limit value of the motor.

According to a prediction intervention request extracting step 140, the controller 205 may extract an expected intervention request (or an amount of torque intervention request) from the shift pattern map that stores an intervention torque for all shifting. A first intervention torque may be extracted from the shift pattern map based on the current demand torque, the shifting speed, and the current gear stage. A second intervention torque may be extracted from the shift pattern map based on the shifting torque, the current wheel speed, and the current gear stage. The expected intervention request (or an expected intervention torque) may be a maximum value of the first intervention torque and the second intervention torque.

According to a second torque command calculating step 145, before the torque intervention control, the controller 205 may calculate a torque command as follows. A motor torque command may be a command corresponding to the motor torque value that is a value obtained by adding the charging torque limit value of the motor to a minimum value between the width and a maximum value of the capability and the expected intervention torque. In other words, the motor torque command is given by the following equation.

The motor torque command=min (the width, max (the capability, the expected intervention torque))+the expected intervention torque of the motor.

An engine torque command may be a command that corresponds to an engine torque value obtained by subtracting the motor torque command (or the motor torque value) from the current demand torque.

After the second torque command calculating step 145, the controller 205 may apply the motor torque command that controls the motor torque to become the motor torque value to the MCU (or the inverter connected to the motor) in the torque intervention control time interval (or the inertia phase time interval), and may apply the engine torque command that controls the engine torque to become the engine torque value to the ECU (or the engine).

Figure 5:
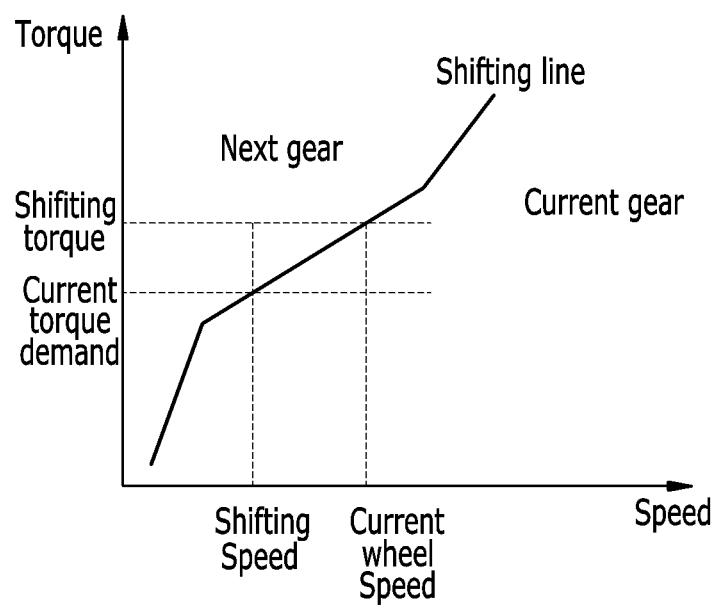
FIG. 5 is a view explaining an embodiment of a gear shifting predicting step shown in FIG. 4.

FIG. 5 is a view explaining an embodiment of a gear shifting predicting step shown in FIG. 4.

Referring to FIG. 5, when torque difference between the current demand torque and the shifting torque is less than a constant value (e.g., the first threshold value), a shift by the transmission 250 may be predicted. The current demand torque may correspond to a current operating point, and the shifting torque may be disposed on a shifting line corresponding to a gear shifting point. In another exemplary embodiment of the present invention, when speed difference between the current wheel speed and the shifting speed is less than a constant value (e.g., the second threshold value), a shift by the transmission 250 may be predicted. The current wheel speed may correspond to the current operating point, and the shifting speed may be disposed on a shifting line corresponding to a gear shifting point.

Figure 6:
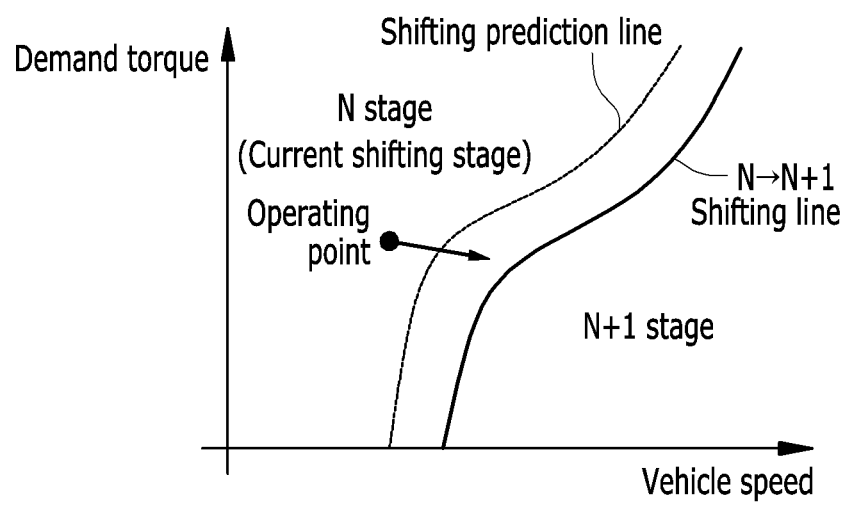
FIG. 6 is a view explaining another embodiment of the gear shifting predicting step shown in FIG. 4.

FIG. 6 is a view explaining another embodiment of the gear shifting predicting step shown in FIG. 4.

As shown in FIG. 6, the shift pattern map may include a shifting prediction line that is set additionally. The shifting prediction line may be a line that shifts (or translates) toward the current operating point as much as a constant value (e.g., the second threshold value) from an original shifting line. The original shifting line may be a line that is converted from an Nth stage to an N+1th stage.

When the current operating point that includes the current wheel speed (or the current demand torque) passes through the shifting prediction line that the shifting speed (or the shifting torque) is disposed on, the controller 205 may determine (or predict) shifting of the transmission 250 as gear shifting up.

Figure 8:
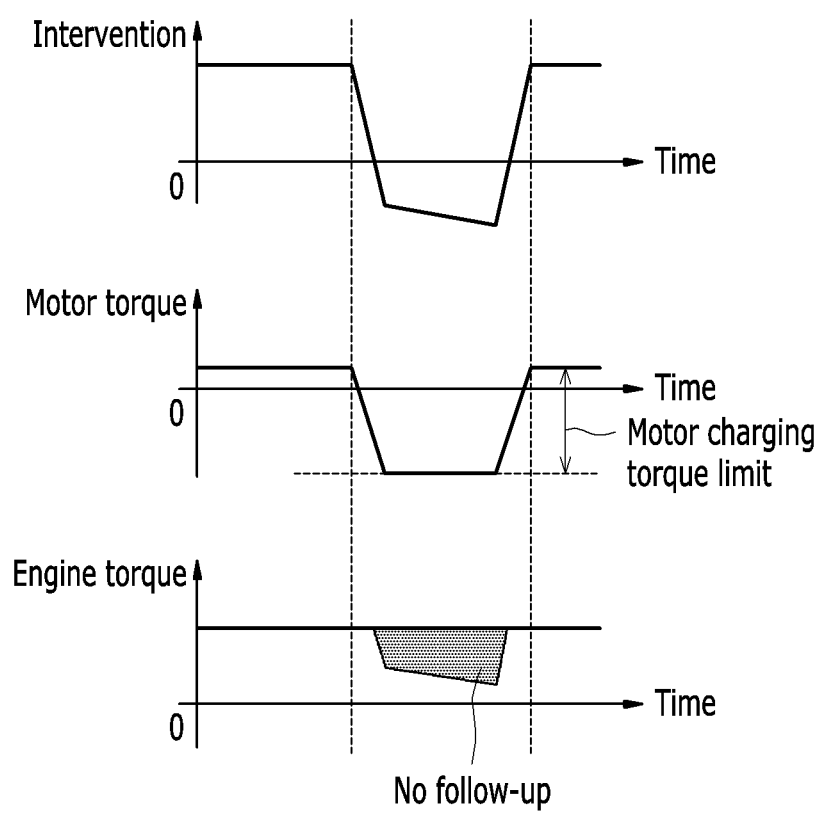
FIG. 8 is a view showing another example of torque intervention control for a transmission input torque.

FIG. 8 is a view showing another example of torque intervention control for a transmission input torque.

In graphs of FIG. 8, a vertical axis may represent a torque. In torque intervention control for a hybrid electric vehicle shown in FIG. 8, intervention of an engine torque may be set to be prohibited in response to torque intervention request below a certain threshold. Therefore, follow-up regarding the torque intervention request may not be performed, and thus shift quality may not be secured. In other words, sagging of a shifting phenomenon in which shifting time is increased may occur. An amount of intervention request is changed during shifting, and thus whether shifting is entered may not be determined in the torque intervention control.

Figure 9:
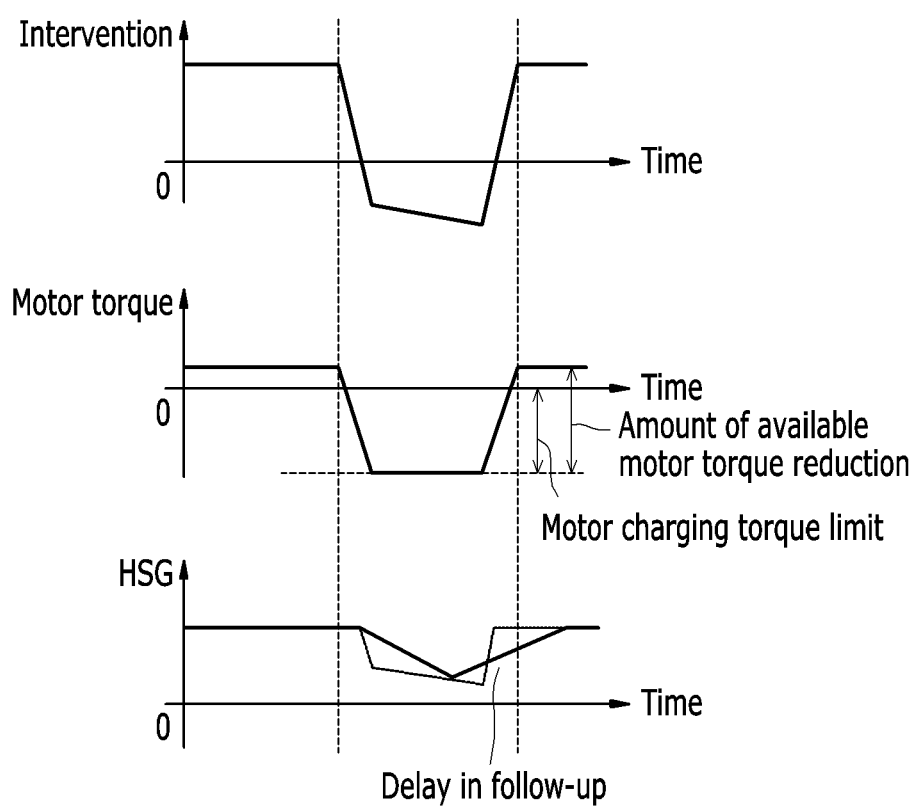
FIG. 9 is a view showing another example of torque intervention control for a transmission input torque.

FIG. 9 is a view showing another example of torque intervention control for a transmission input torque.

In FIG. 9, a vertical axis may represent a torque. In torque intervention control for a hybrid electric vehicle shown in FIG. 9, an engine torque intervention below a certain threshold may be performed by a hybrid starter and generator (HSG). However, because of a torque change rate limit of the HSG, shift quality may not be secured.

Figure 10:
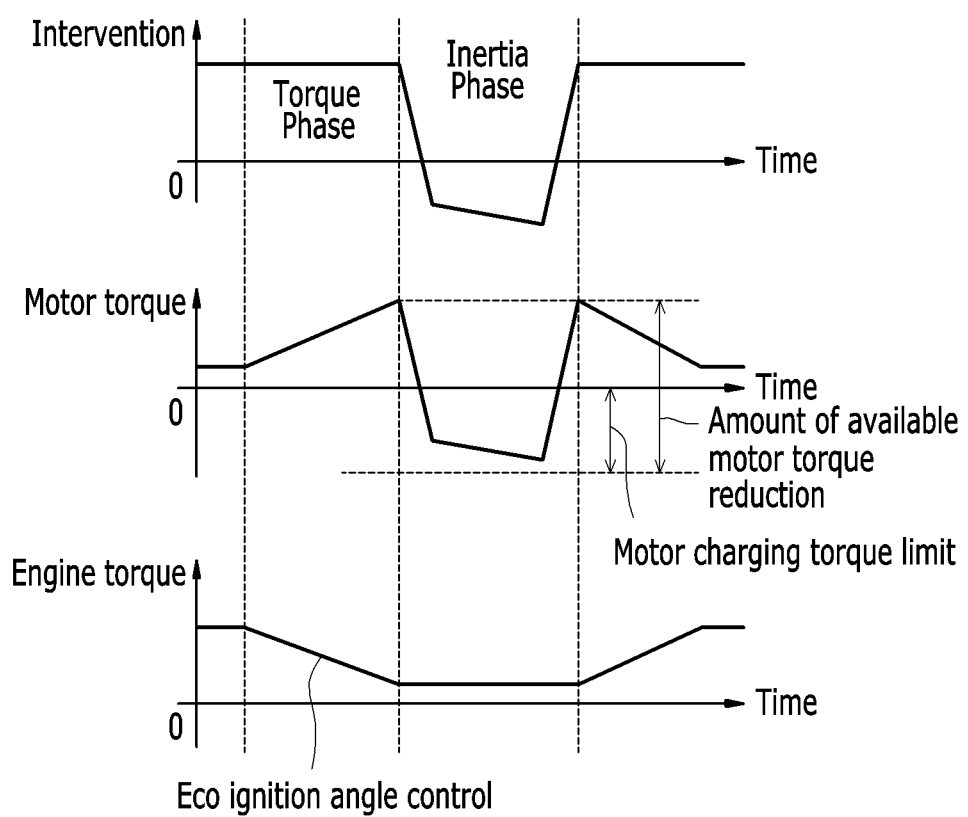
FIG. 10 is a view explaining the method for controlling torque intervention of the hybrid vehicle according to another embodiment of the present invention.

FIG. 10 is a view explaining the method for controlling torque intervention of the hybrid vehicle according to another embodiment of the present invention. In FIG. 10, a vertical axis may represent a torque. The method for controlling torque intervention of the hybrid vehicle may be applied to the hybrid vehicle 200 shown in FIG. 7.

Referring FIG. 7 and FIG. 10, during a torque phase time interval included in the shifting time interval, the controller 205 may reduce torque of the engine 210 which is connected to the motor 230 through the engine clutch 225 and generates a power transferred to the transmission 250 by reducing the amount of air supplied to the engine in the state in which control for generating optimal combustion efficiency of the engine is maintained. The transmission 250 may include the dual clutch transmission. The control for generating optimal combustion efficiency, which is the eco ignition angle control, may be obtained by controlling an ignition angle of the engine according to the amount of air supplied to the engine in order to maximize efficiency of the engine 210.

The controller 205 may increase torque of the motor as much as the reduced torque of the engine during the torque phase time interval.

During the inertia phase time interval included in the shifting time interval, the controller 205 may reduce the increased torque of the motor as a value obtained by subtracting the reduced torque of the engine from an amount of torque intervention request for the transmission 250. The amount of torque intervention request may be determined in advance by experimental results, and a description thereof is similar to a description of FIG. 4 explained above.

In a torque phase time interval that is after the inertia phase time interval, the controller 205 may increase torque of the engine 210 as much as the reduced torque of the engine by increasing the amount of air supplied to the engine in the state in which the control for generating optimal combustion efficiency is maintained, and may increase torque of the motor 230 as much as a value obtained by subtracting the increased torque of the engine from a torque required for input of the transmission 250.

As described above, according to the present invention, it is possible to adjust a torque distribution ratio between the motor and the engine in the torque phase time interval in which there is no change in rotational speeds of the engine and the motor and there is only a change in torques of the engine and the motor, and, after shifting of the transmission 250 is started, may reduce the engine torque in the torque phase time interval. When the engine torque is reduced, the amount of air supplied to the engine may be reduced in the state in which the control for generating optimal combustion efficiency is maintained. Therefore, the amount of available torque intervention of the motor may be increased. Accordingly, torque intervention may be performed by using only the motor in the inertia phase time interval that may be included in an actual shifting time interval.

After shifting is completed, a torque distribution ratio between the motor 230 and the engine 210 may be restored. Therefore, torque intervention using the engine may be avoided without sacrifice of shift quality.

As set forth above, exemplary embodiments have been disclosed in the accompanying drawings and the specification. Herein, specific terms have been used, but are just used for the purpose of describing the present invention and are not used for qualifying the meaning or limiting the scope of the present invention, which is disclosed in the appended claims. Therefore, it will be understood by those skilled in the art that various modifications and equivalent exemplary embodiments are possible from the present invention. Accordingly, the actual technical protection scope of the present invention must be determined by the spirit of the appended claims.

What is claimed is:

1. A method for controlling torque intervention of a hybrid vehicle, comprising:
   during a torque phase time interval included in a shifting time interval, reducing, by a controller, torque of an engine which is connected to a motor through an engine clutch, wherein the engine generates a power transferred to a transmission, the torque of the engine being reduced by reducing an amount of air supplied to the engine in a state in which control for generating optimal combustion efficiency of the engine is maintained;
   increasing, by the controller, torque of the motor as much as the reduced torque of the engine during the torque phase time interval; and
   during an inertia phase time interval included in the shifting time interval, reducing, by the controller, the increased torque of the motor as a value obtained by subtracting the reduced torque of the engine from an amount of torque intervention request for the transmission,
   wherein the control for generating optimal combustion efficiency is obtained by controlling an ignition angle of the engine according to the amount of air supplied to the engine to maximize efficiency of the engine.

2. The method of claim 1, further comprising:
   after the inertia phase time interval, increasing, by the controller, torque of the engine as much as the reduced torque of the engine by increasing the amount of air supplied to the engine in the state in which the control for generating optimal combustion efficiency is maintained; and
   after the inertia phase time interval, increasing, by the controller, torque of the motor as much as a value obtained by subtracting the increased torque of the engine from a torque required for input of the transmission.

3. The method of claim 1, wherein the transmission comprises a dual clutch transmission.

4. A method for controlling torque intervention of a hybrid vehicle, the method comprising:
   predicting, by a controller, a shifting time of a transmission and an amount of torque intervention request for the transmission in an inertia phase time interval included in a shifting time interval by a shift pattern map based on a current speed of the vehicle;
   after predicting the shifting time, reducing, by the controller, torque of an engine which is connected to a motor through an engine clutch, wherein the engine generates a power transferred to the transmission, the torque of the engine being reduced by reducing an amount of air supplied to the engine in a state in which control for generating optimal combustion efficiency of the engine is maintained;
   increasing, by the controller, torque of the motor as much as the reduced torque of the engine; and
   during the inertia phase time interval, reducing, by the controller, the increased torque of the motor as a value obtained by subtracting the reduced torque of the engine from the amount of torque intervention request for the transmission,
   wherein the control for generating optimal combustion efficiency is obtained by controlling an ignition angle of the engine according to the amount of air supplied to the engine to maximize efficiency of the engine.

5. The method of claim 4, further comprising:
   after the inertia phase time interval, increasing, by the controller, torque of the engine as much as the reduced torque of the engine by increasing the amount of air supplied to the engine in the state in which the control for generating optimal combustion efficiency is maintained; and
   after the inertia phase time interval, increasing, by the controller, torque of the motor as much as a value obtained by subtracting the increased torque of the engine from a torque required for input of the transmission.

6. The method of claim 4, wherein the transmission comprises a dual clutch transmission.

7. A device for controlling torque intervention of a hybrid vehicle, comprising:
   an engine which is connected to a motor through an engine clutch, the engine generating a power transferred to a transmission; and
   a controller which predicts a shifting time of the transmission and an amount of torque intervention request for the transmission in an inertia phase time interval included in a shifting time interval by a shift pattern map based on a current speed of the vehicle,
   wherein after the predicted shifting time, the controller reduces torque of the engine by reducing an amount of air supplied to the engine in a state in which control for generating optimal combustion efficiency of the engine is maintained,
   the controller increases torque of the motor as much as the reduced torque of the engine,
   during the inertia phase time interval, the controller reduces the increased torque of the motor as a value obtained by subtracting the reduced torque of the engine from the amount of torque intervention request for the transmission, and the control for generating optimal combustion efficiency is obtained by controlling an ignition angle of the engine according to the amount of air supplied to the engine to maximize efficiency of the engine.

8. The device of claim 7, wherein after the inertia phase time interval, the controller increases torque of the engine as much as the reduced torque of the engine by increasing the amount of air supplied to the engine in the state in which the control for generating optimal combustion efficiency is maintained and the controller increases torque of the motor as much as a value obtained by subtracting the increased torque of the engine from a torque required for input of the transmission.

9. The device of claim 7, wherein the transmission comprises a dual clutch transmission.

* * * * *